United States Patent [19]
Lin

[11] Patent Number: 5,735,052
[45] Date of Patent: Apr. 7, 1998

[54] UNIVERSAL TAPE MEASURE

[76] Inventor: Hsiao-Chung Lin, 2F, No. 116, Yang Ming Street, Pan Chiao City, Taipei Hsien, Taiwan

[21] Appl. No.: 731,991

[22] Filed: Oct. 23, 1996

[30] Foreign Application Priority Data

Jun. 28, 1996 [TW] Taiwan .................. 85209789

[51] Int. Cl.$^6$ ............................................ B43L 9/04
[52] U.S. Cl. ........................ 33/27.03; 33/760; 33/769
[58] Field of Search ......................... 33/759, 760, 761, 33/768, 769, 770, 668, 27.03

[56] References Cited

U.S. PATENT DOCUMENTS

| | | | |
|---|---|---|---|
| 2,816,369 | 12/1957 | Becker | 33/760 |
| 2,942,348 | 6/1960 | Caruso | 33/761 |
| 3,526,964 | 9/1970 | Clark, Jr. | 33/761 |
| 4,697,349 | 10/1987 | Lee | 33/760 |
| 4,744,150 | 5/1988 | Horvath | 33/760 |
| 4,766,673 | 8/1988 | Bolson | 33/760 |
| 4,914,830 | 4/1990 | Legare | 33/768 |
| 5,134,784 | 8/1992 | Atienza | 33/769 |

FOREIGN PATENT DOCUMENTS

| | | | |
|---|---|---|---|
| 1306082 | 9/1962 | France | 33/761 |
| 170114 | 1/1960 | Sweden | 33/761 |

Primary Examiner—Thomas B. Will
Attorney, Agent, or Firm—Varndell Legal Group

[57] ABSTRACT

A universal tape measure including a housing formed with a downward extending opening on a lateral side. A lower end of the opening is disposed with a pen tip opening. An inner wall of the opening is disposed with intersecting cross lines which outward extend to mark a right angle cutout. The tape measure is marked with scales such as metric system scale, British Imperial scale and/or other scales. The tape measure is further formed with a circle center hole. The universal tape measure has the functions of drafting a circle, measuring whether an article is vertical and measuring the horizontal distance between two points on different levels.

4 Claims, 3 Drawing Sheets

UNIVERSAL TAPE MEASURE

BACKGROUND OF THE INVENTION

The present invention relates to a universal tape measure has the functions of drafting a circle, measuring whether an article is vertical and measuring the horizontal distance between two points on different levels.

An existing tape measure can only measure the horizontal distance between two points on the same level. When it is desired to measure the horizontal distance between two points on different levels, conventionally the tape is pulled out and then a plumb line tying a plumb is used to locate a vertical point for measuring the horizontal distance. Such procedure is quite troublesome and inaccurate. Moreover, with the conventional tape measure, a user cannot draft a circle. This causes inconvenience in use.

SUMMARY OF THE INVENTION

It is therefore a primary object of the present invention to provide a universal tape measure which can be conveniently used to accurately draft a circle, measure whether an article is vertical and measure the horizontal distance between two points on different levels.

According to the above object, the universal tape measure of the present invention includes a housing having two parallel symmetrical waits. One lateral side (or a rear end) of the housing is formed with a downward extending opening. A lower end of the opening is adapted to receive a writing instrument. An inner wall of the downward extending opening is disposed with intersecting cross lines which mark a right angle cutout. The tape is marked with linear scales such as metric system and British Imperial scales. The tape is further formed with a circle center hole for drafting a circle.

As level bubble is disposed beside the downward extending opening, whereby the cut right angle and the level bubble are used to measure whether an article is vertical. In addition, the downward extending opening and the level bubble are used to measure the horizontal distance between two points on different levels. The cross lines are disposed on the inner wall of the downward and extending opening in a dented or projecting pattern.

The present invention can be best understood through the following description and accompanying drawings, wherein:

DETAILED DESCRIPTION OF THE PREFERRED EMBODIMENT

Figure 1:
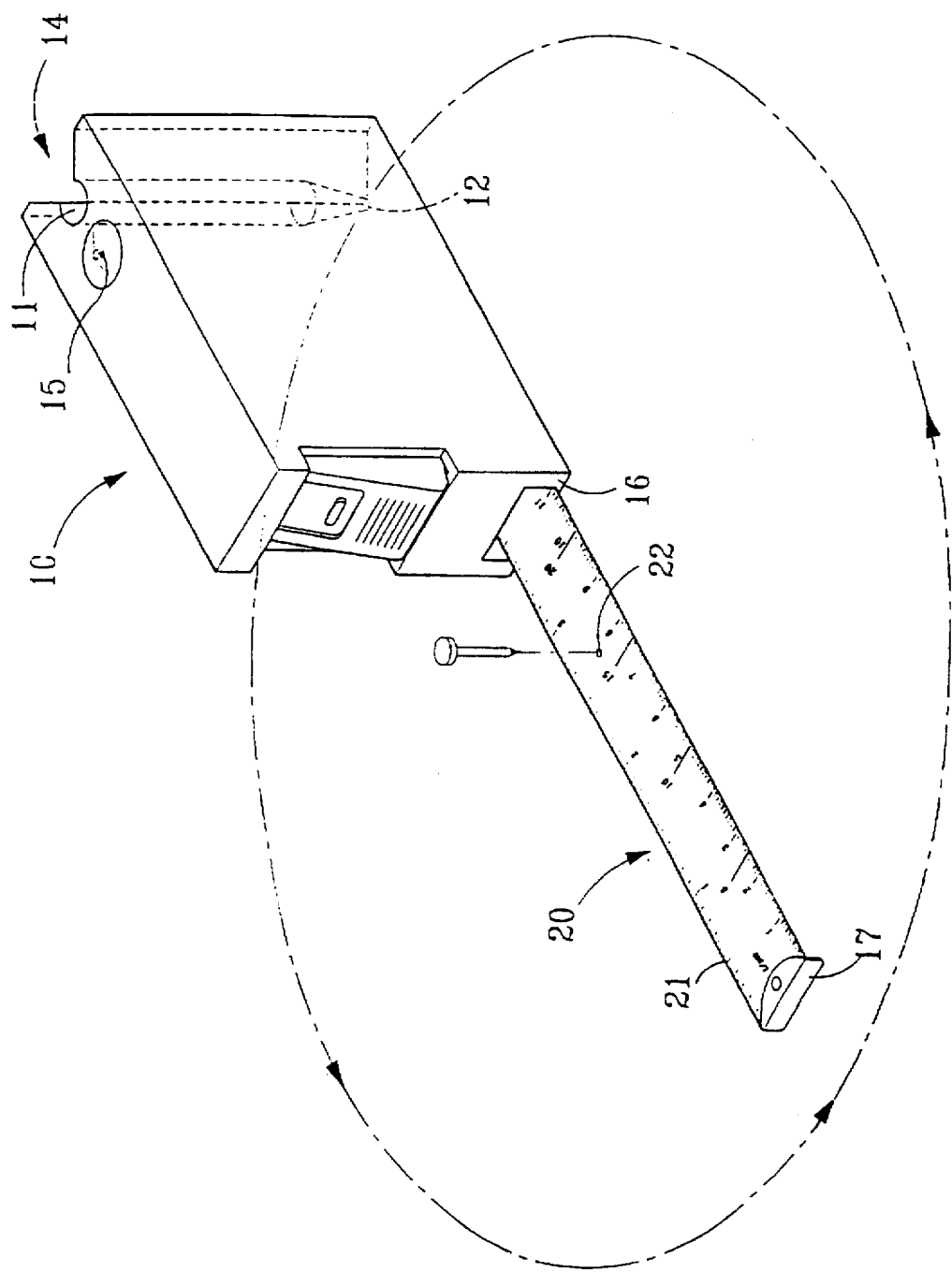
FIG. 1 is a perspective assembled view of the present invention.
Figure 2:
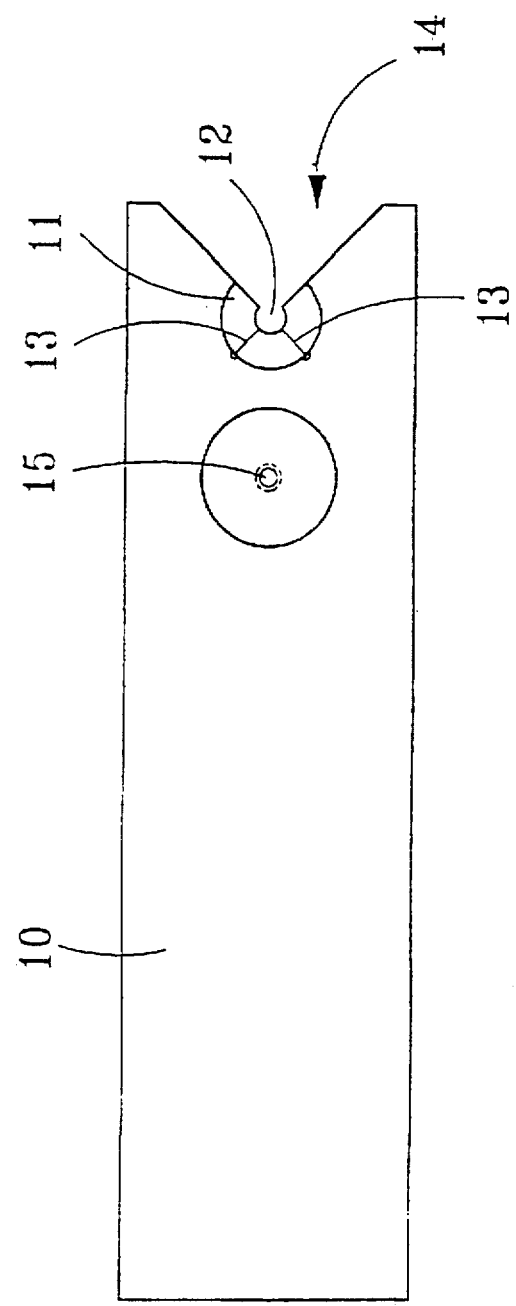
FIG. 2 is a top assembled view of the present invention.

Please refer to FIGS. 1 and 2. The universal tape measure of the present invention includes a housing 10 having two parallel symmetrical walls. One lateral side or a rear end of the housing 10 is formed with a downward extending opening 11. The lower end of the opening 11 is disposed with a pen tip opening 12. The downward extending opening 11 includes an upper cylindrical hole and a truncated hollow cone, where a base of the truncated hollow cone abuts a lower end of the cylindrical hole and the pen tip opening 12 is arranged at the truncated end of the truncated hollow cone. The one lateral side (or rear end) further includes two flat walls extending a length of the lateral side (or rear end) and intersecting the downward extending opening, so that the two flat walls form a right angle cutout 14 by having upper edges that form a right angle when viewed along an axis of the cylindrical hole. The portion of the housing surrounding the hollow truncated cone portion of the downward extending opening 11 has the cross lines 13 in alignment with the upper edges of the two flat walls.

Figure 3:
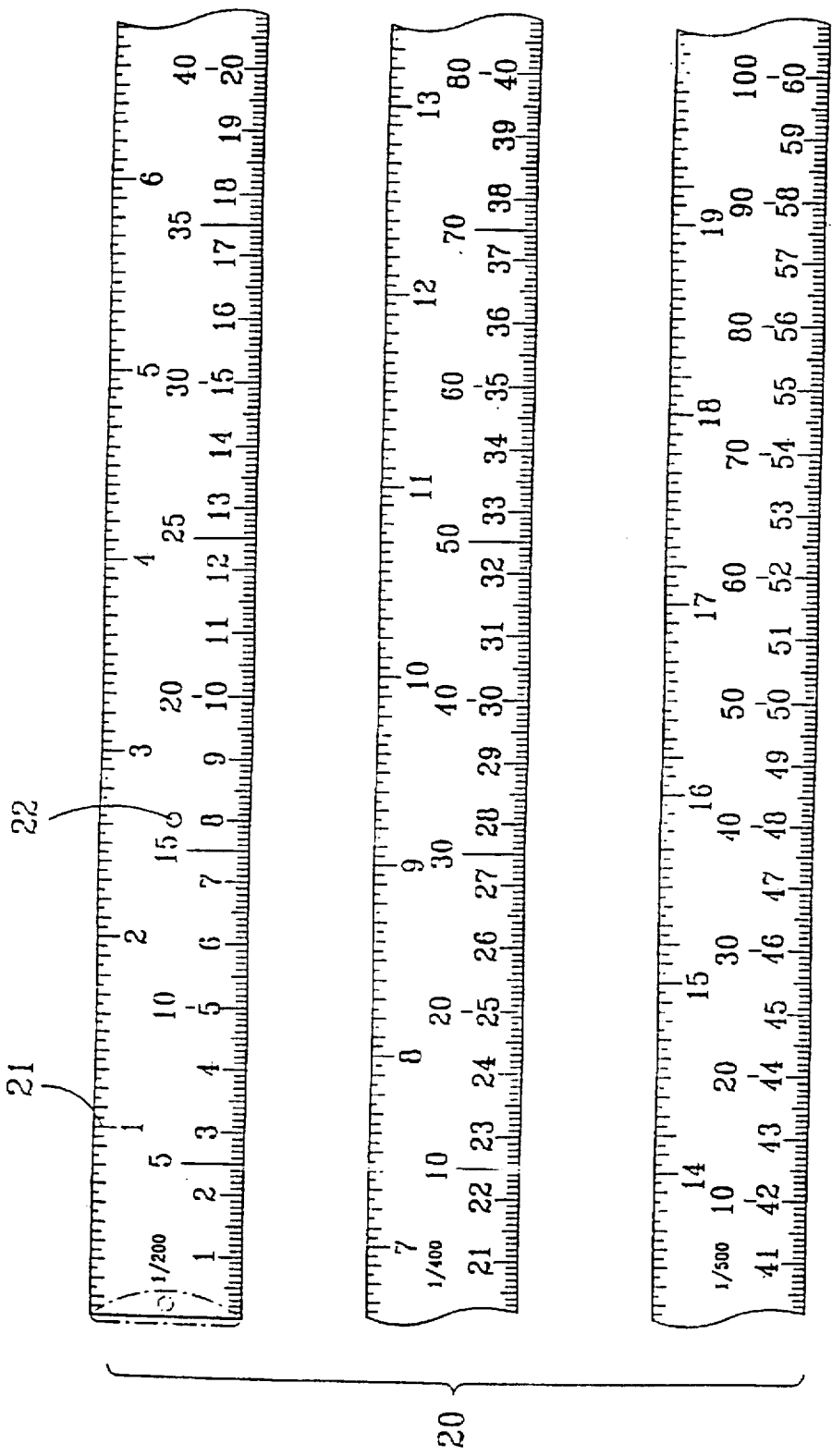
FIG. 3 is a front view showing the scales marked on the tape of the present invention.

Referring to FIG. 3, the tape 20 is marked with a linear scale 21 such as metric system scale, an British Imperial scale and/or other scales. The scale includes 1/200, 1/400 and 1/500 scale. In addition, the tape 20 is formed with a circle center hole 22.

A level bubble 15 is disposed beside the cylindrical hole of the opening 11. The right angle cutout 14 and the level bubble 15 serve to measure whether an article is vertical. The cylindrical hole 11 and the level bubble 15 serve to measure the horizontal distance between two points on different levels. The cross lines 13 are disposed on the inner wall surrounding the truncated hollow cone of the opening 11 in a dented or projecting pattern.

The present invention improves the shortcoming of insufficiency of function of the conventional tape. In addition, the present invention is able to (1) draft a circle, (2) measure whether an article is vertical and (3) measure the horizontal distance between two points on different levels. The functions of the present invention are described as follows:

(1) With the circle center hole 22 serving as the circle center, the distance between the circle center and the front hook 17 of the tape is equal to the distance between the front end 16 of the housing 10 and the pen tip opening 12. Therefore, the radius of the circle is just the scale seen at the front end 16 of the housing 10. A nail is fixed in the circle hole 22 and a pen is inserted into the cylindrical hole 11 to draft a circle with desired radius.

(2) The cut right angle 14 is attached to the article to be measured and the level bubble 15 is observed to see whether the level bubble 15 is in the horizontal position so as to measure whether the article is vertical.

(3) When measuring the horizontal distance between two points on different levels, the tape 20 is pulled out with the front hook 17 fixed at the higher point. Then the tape 20 is pulled to the upper side of the lower point. Then the lower point is downward seen from the cross lines 13 in the cylindrical hole 11 to observe whether the level bubble 15 is in the horizontal position. If so, the sum of the scale shown on the tape 20 and the distance from the front end 16 of the tape to the pen tip opening 12 is just the horizontal distance between the two points on different levels.

It should be noted that the above description and accompanying drawings are only used to illustrate one embodiment of the present invention, not intended to limit the scope thereof. Any modification of the embodiment should fall within the scope of the present invention.

What is claimed is:

1. A universal tape measure comprising a housing having two parallel symmetrical side walls and a rear end, and a tape marked with a linear scale and having a circle center hole, the rear end having a downward extending opening adapted to hold a writing instrument for drafting a circle together with the circle center hole of the tape, the downward extending opening including an upper cylindrical hole with a truncated hollow cone arranged with a base of the truncated hollow cone abutting a lower end of the cylindrical hole, the rear end further including two flat walls extending a length of the rear end and intersecting the downward extending opening, the two flat walls forming a right angle cutout by having upper edges that form a right angle when viewed along an axis of the cylindrical hole, and a portion of the housing surrounding the truncated hollow cone of the downward extending opening having cross lines in alignment with the upper edges of the two flat walls.

2. A universal tape measure as claimed in claim 1, wherein a level bubble is disposed beside the cylindrical hole.

3. A universal tape measure as claimed in claim 1, wherein the cross lines have a dented pattern.

4. A universal tape measure as claimed in claim 1, wherein the cross lines have a projecting pattern.

* * * * *